3,053,006
SUPPORT FOR FISHING LURES OR THE LIKE
Ben J. Horner, 3555 Cornell Drive, Dayton 6, Ohio
Filed Feb. 2, 1960, Ser. No. 6,221
1 Claim. (Cl. 43—57.5)

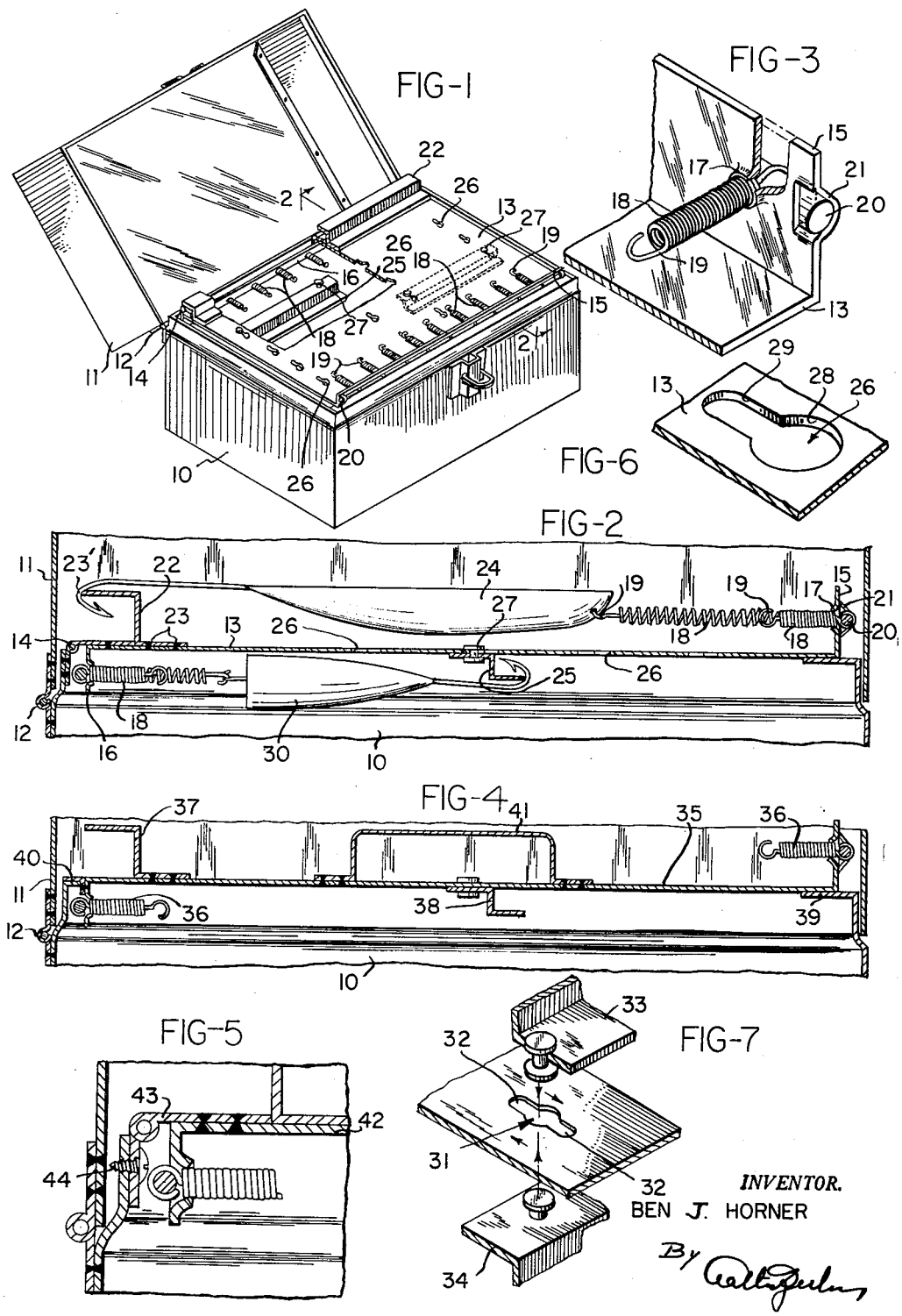

This invention relates to a device for supporting fishing lures and particularly to a panel-like device that can be included in a tackle box as an auxiliary shelf or platform.

Fishing lures, such as plugs or the like, generally have hooks projecting from one end and means at the other end in the form of an eye or leader or the like for connection of the lure with a fishing line. Such lures are a problem to store because, if they are individually boxed, the storage of several lures creates a bulk problem and they cannot be carried loose because of the hazard of injuries to the fisherman and also because the lures will become entangled. Various devices have been made for supporting the lures by engaging the opposite ends thereof, such devices including, for example cylindrical plastic members. These devices, while they support the lures in a safe manner, are not as convenient as might be desired because they themselves occupy bulk and are not always located in an easily accessible position.

The present invention proposes the provision of an improved arrangement for supporting fishing lures, such as plugs and the like, thereby eliminating the difficulties referred to above.

It is also an object of the invention to provide an improved lure supporting arrangement which can be carried more conveniently than known devices of this nature.

A still further object of this invention is the provision of a device for supporting fishing lures, such as plugs and the like, which can be included in a tackle box so as to be positioned in a very convenient manner for gaining access to the lures to remove them or for storing the lures on the device.

In general, the objects referred to above are attained by providing a flat panel having ledges thereon that are either fixed on the panel or adjustable thereon and which ledges engage the hooks of the lures. In spaced relation with the ledges are springs which can engage the other ends of the lures so that the lures may be held firmly on the ledges by the springs and are thus attached to the panel.

The panel can be hinged in a tackle box or it can be placed therein as a movable shelf and, in either instance, the panel is conveniently located within the tackle box and takes up a minimum amount of space.

The nature of the present invention will be more completely understood with reference to the accompanying specification taken in connection with the drawings in which:

FIGURE 1 is a perspective view showing a tackle box of a more or less conventional nature with the lid open and having a shelf or platform for receiving lures according to the present invention mounted therein.

FIGURE 2 is a fragmentary transverse vertical section, partly broken away, indicated by line 2—2 on line 1.

FIGURE 3 is a fragmentary view drawn on an enlarged scale showing the manner in which a spring forming a part of the lure support is carried by the platform.

FIGURE 4 is a fragmentary sectional view similar to FIGURE 2 which shows the platform or shelf according to this invention loosely mounted in the tackle box so that it can be lifted therefrom bodily.

FIGURE 5 is a fragmentary sectional view showing the manner in which a shelf or platform according to the present invention could be mounted in existing tackle boxes to form a part thereof.

FIGURE 6 is a fragmentary perspective view drawn on an enlarged scale showing the key hole slots in the platform which provide adjustable means for supporting at least some of the ledges on the platform that are engaged by the hooks of the fishing lures.

FIGURE 7 is a view similar to FIGURE 6 showing a modified arrangement in which the key hole slots are made double ended so that ledges can be supported adjustably on both faces of the shelf or platform.

In general, the present invention comprises a flat rectangular panel preferably of metal adapted for being placed in a tackle box as an auxiliary hinged shelf or panel or as a loose shelf or panel. Extending longitudinally along the panel at each edge and in opposite directions are supports to which springs are attached. In spaced relation to the springs and either fixed to the panel or adjustable thereon are upstanding ledges adapted for engagement with the hooks of the lures so that, when the lures are to be placed on the panel, one end is connected to the spring and the spring is stretched until the hook engages over the appropriate ledge whereupon the lure will remain supported on the shelf or platform.

Referring to the drawings more particularly, in FIGURE 1 there is a tackle box 10 having a lid 11 hinged thereto as by the hinge 12, which will be seen in FIGURE 2.

According to this invention there is provided a flat shelf or platform 13, preferably of metal, which overlies the upper open end of the tackle box 10, as will be seen in FIGURE 2. The shelf or platform 13 may be attached to one side of the tackle box by a hinge or hinges 14 which may be welded to the platform and the tackle box when the platform is included as a part of the original manufacture.

The shelf or platform 13 has an upstanding edge part 15 at one side and a corresponding part 16 extending in the opposite direction at the other side. These upstanding parts preferably extend across the complete width of the shelf or platform. Each upstanding part has a series of apertures 17 formed therein through which springs 18 extend. The material of each edge part surrounding and thus defining the apertures is flared toward the center of the shelf or platform, as can be seen in FIGURES 2 and 3, so as to locate each aperture in such position that the peripheral wall of the aperture will engage the spring pertaining thereto somewhat inwardly from its outer end. In this manner, the springs are supported cantilever fashion so as to be in parallel spaced relation with the shelf or platform and with each other and thus it becomes quite convenient to hook the lure to the hook portion 19 formed on the inner end of each spring. In effect, the upstanding part has a plurality of recesses or indentations therein projecting toward the center of the shelf and each recess or indentation is apertured at the bottom to form the spring receiving holes.

For holding the springs in position there is a rod 20 extending across the back of each of the upstanding portions 15 and 16. The rods 20 may be fixed in position by welding or the end parts of the upstanding portions 15 and 16 may have portions 21 struck out therefrom at the time of forming the shelf or platform, which will serve to retain the rods 20 removably in position so that, if necessary, the rods can be removed for replacing damaged springs.

Referring to FIGURES 1 and 2, it will be noted that, on the upper side of the shelf or platform 13, there is a Z-shaped ledge member 22 extending transversely across the shelf or platform parallel with the edge and fixed in place by spot welding 23. The ledge member 22 is utilized for engaging the hook 23' of a lure, such as a plug, having a body 24 and with the opposite end of the body having an eye or aperture or the like that is engaged by the hooked end 19 of one of the springs 18, which is stretched, as indicated, when the lure is in position.

As will be noted in FIGURE 1, there are a plurality of springs 18 and this permits a plurality of lures to be supported on the face of the panel in the same manner as the one indicated on the upper side of the panel in FIGURE 2. The springs 18 are relatively soft and will, therefore, accommodate themselves to lures of different lengths.

The lure shown on the top side of the platform in FIGURE 2 is a relatively long lure but a great many lures are substantially shorter. With this in mind, the underneath side of the platform is arranged for supporting lures of considerably shorter lengths which could not be mounted on the upper face without stretching the springs 18 beyond allowable limits.

This is accomplished by providing two or more ledge members 25 on the lower side of the panel which correspond to the Z-shaped ledge member 22 above referred to except that the ledge members 25 are adjustably supported on the panel so that they can be placed in different positions thereon relative to the springs 18 extending from the edge portion 16 of the panel. The adjustable support of ledge members 25 on the panel is accomplished by providing at least two rows of apertures 26 in the panel for each of the ledge members 25. These apertures are adapted for receiving the studs or rivets 27 attached to the members 25. The studs or rivets 27 have heads adapted for being received in the larger end parts 28 of the apertures 26 and shank portions adapted for being received in the extensions 29 of the apertures when the ledge members 25 are placed in position in any of the pairs of apertures pertaining thereto. The lure, such as the lure 30, shown in FIGURE 2, will serve to hold the ledge members fixedly in place. By providing a plurality of the ledge members on the under side of the panel, and providing a plurality of pairs of apertures for each one, lures of widely varying sizes can be supported on the two faces of the panel.

The outer edges of the ledge members may be about the same distance from shelf 13 as the centers of the apertures 17 for the springs that are to co-operate with the ledge members. The ledge members could, of course, be closer or farther away from the shelf, but, in general, will be about the same distance away as the springs.

The nature of the key hole aperture referred to above is illustrated in FIGURE 6 while, in FIGURE 7, there is disclosed another type of aperture 31 which has extensions 32 extending in opposite directions from the enlarged center part of the aperture so that ledge members 33 can be mounted on either face of the panel. With apertures of the nature shown in FIGURE 7 the fixed ledge member 22 can be eliminated, if desired.

The shelf or platform so far described is hinged in the tackle box at the top and this is a convenient location which makes the lures readily accessible at all times.

It is also possible, however, to practice the present invention with the platform in the form of a removable shelf and an arrangement of this nature is illustrated in FIGURE 4. In this view, the shelf or platform 35 has the springs 36 and the ledges 37 and 38 for engaging the hook ends of the lures either fixedly or adjustably mounted on the panel. The panel is arranged so that it rests on top of the inturned edge portions 39 and 40 of the tackle box, or short projections can be provided inside the tackle box for this purpose. Preferably, the panel 35 of the FIGURE 4 modification has means for lifting it out of the box, which might take the form of a handle 41 or might consist of a finger hole or holes in the panel, or an eye loosely mounted on the panel in some convenient location. With this arrangement shown in FIGURE 4 the entire shelf or panel can be removed and be carried about without carrying the entire tackle box.

For existing tackle boxes, the arrangement of the present invention can be supplied either as a loose shelf or platform, as in FIGURE 4, or it may be arranged as shown in FIGURE 5 wherein the platform 42 has a hinge 43 thereon which can be attached by a screw or screws 44 to the edge of the tackle box. This permits existing tackle boxes readily to be converted to obtain the advantages of the present invention.

An important feature of the present invention is in the spring support which provides that the springs are supported parallel with each other and parallel with the shelf, but wherein the major portion of the length of each spring is free to deflect laterally so that the springs can readily accommodate themselves to fishing lures of different thickness. The exposure of the major length of each spring also permits manipulation of the springs by the fingers when necessary.

It will be understood that it is desired to include within the purview of this invention such modifications and adaptations thereto as will occur to one skilled in the art.

What is claimed is:

A device for supporting fishing lures comprising: a flat rigid panel, said panel having its opposite edge portions projecting in opposite directions at right angles thereto, each edge portion having a plurality of apertures formed therein in spaced relation, a spring extending through and closely fitting each said aperture, means supporting the end of each spring located on the outside of each upstanding edge part whereby the springs extend inwardly of the panel and are supported parallel thereto and to each other, ledge members on opposite sides of the panel parallel to and in spaced relation with the upstanding edge parts of the panel, and each ledge member having an edge extending away from the upstanding edge part on the same side of the panel whereby fishing lures can be connected at their one ends to the inner ends of said springs and have their hooks engaged over said ledge members for supporting the lures compactly adjacent the faces of said panel, there being means for adjustably supporting at least one of said ledge members on the panel, said means comprising key hole shaped slots formed in the panel, and headed studs attached to at least said one ledge member removably positioned in said slots, said key hole slots having their smaller ends directed toward the springs pertaining to the adjustable ledge member so that lures engaged with the adjustable ledge member will serve to retain it in position on the panel.

References Cited in the file of this patent

UNITED STATES PATENTS

| 1,571,762 | Driscoll | Feb. 2, 1926 |
| 1,791,346 | Burch et al. | Feb. 3, 1931 |
| 2,041,231 | Collins | May 19, 1936 |
| 2,849,829 | Fisher et al. | Sept. 2, 1958 |

FOREIGN PATENTS

| 24,774 | Great Britain | 1912 |
| 698,318 | Great Britain | Oct. 14, 1953 |